(No Model.)
A. MARCEAU.
NAIL.
No. 464,744. Patented Dec. 8, 1891.
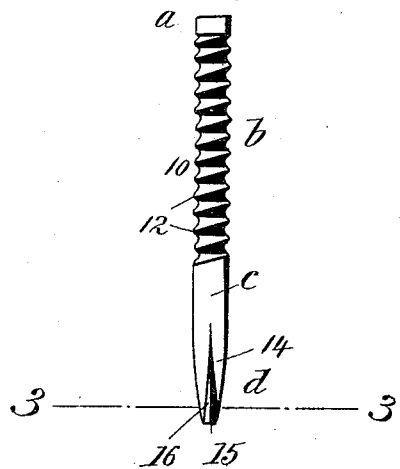
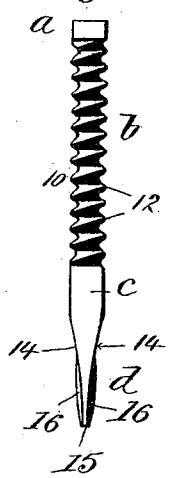
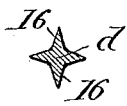
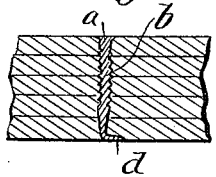
Witnesses:
J. H. Goffey
G. M. Chamberlain.
Inventor,
Alfred Marceau
By Chapin & Co
his Attorneys

UNITED STATES PATENT OFFICE.

ALFRED MARCEAU, OF SPRINGFIELD, MASSACHUSETTS.

NAIL.

SPECIFICATION forming part of Letters Patent No. 464,744, dated December 8, 1891.

Application filed February 9, 1891. Serial No. 380,731. (No model.)

*To all whom it may concern:*

Be it known that I, ALFRED MARCEAU, a citizen of the United States, residing at Springfield, in the county of Hampden and State of Massachusetts, have invented new and useful Improvements in Nails, of which the following is a specification.

This invention relates to improvements in nails, especially those employed in the manufacture of boots and shoes, although the invention is not to be understood as limited to such particular kind of nails.

The object of the invention is mainly the provision of a nail which, while being to all intents and purposes sharp-pointed, is also so re-enforced at its point that in being driven through sole-leather or other hard, close, or compact material the point will not turn over or cripple.

The further purpose of the invention is to otherwise improve the construction of the nail for its most efficient use.

The substance of the invention will be more fully understood on reference to the following description, in conjunction with the accompanying drawings and the claim.

In the drawings, Figures 1 and 2 are enlarged views of the nail as seen at sides at right angles to each other. Fig. 3 is a cross-section on line 3 3, Fig. 1. Fig. 4 is a sectional view through several thicknesses of leather or other material and through the nail, which is shown as clinched in such material. Fig. 5 is a sectional view, on an enlarged scale, of the shank portion of the nail as preferably constructed.

In the drawings, $a$ represents the head end or driving portion of the nail, $b$ the shank, and $d$ the portion or section constituting the point. The shank as to the greater portion of its length is generally formed round in cross-section and corrugated, the ribs and grooves intermediate thereof being spirally formed, as in a screw. The portion $c$ of the shank which is above its point-section $d$ and below the corrugations 10 is round and of a cross-sectional bulk or area as great as that of the ribs or threads 12. The said portion $c$ is thence forwardly tapered on opposite sides thereof, as at 14 14, said sides meeting at the very end 15 of the nail in what is understood as a "point-of-chisel" form—that is, the point is thin and as compared to its thickness quite wide. The opposite inclining sides 14 of the nail are intermediately and longitudinally thereof provided with outwardly-extending webs 16 16, which extend from a suitable distance back from the point end of the nail to said point, substantially as shown, said webs being widest at their bases.

The nail is to be integrally formed in any of the well-known or appropriate methods, and is to be composed of brass, iron, steel, or other suitable or desirable metal.

A nail provided with a point substantially such as described and shown, and which as to its shank is of comparatively small diameter, and which is also corrugated, may be readily driven into and through one or several thicknesses of sole-leather, as a shoe sole or heel, without crippling or overturning as to the practically sharp point, and the portion $c$ of the nail which is above the point, but in advance of the screw-like part, being of a diameter as great as that of the helical ribs 12 of the said screw part, in the driving of the nail prepares a passage which permits of the ready entrance of the nail into the material without tearing or dragging by the screw part along the fibers of the material being penetrated or without materially injuring the said helical or ribbed and grooved portion of the shank. After the nail has been driven the material of course closes in firmly upon and about the screwed portion of the shank.

The corrugated or ribbed and grooved part of the nail-shank is not necessarily formed helical, although in the production of the nail the helical feature of the shank ribs and grooves is the more convenient; but of course truly circular and non-spiral ribs and grooves may be formed in the nail-shank.

What I claim as my invention is—

A nail with a screw-threaded body portion of some length, a cylindrical portion of diameter equal to the extreme diameter of the screw-thread below the same, and a chisel-point having wings on its flattened faces below said cylindrical portion, substantially as described.

ALFRED MARCEAU.

Witnesses:
H. A. CHAPIN,
G. M. CHAMBERLAIN.